(12) United States Patent
Barrenscheen

(10) Patent No.: US 7,133,953 B2
(45) Date of Patent: Nov. 7, 2006

(54) DATA TRANSMISSION DEVICE USED TO FORWARD DATA RECEIVED AT A FIRST DEVICE FOR A SECOND DEVICE TO THE SECOND DEVICE

(75) Inventor: Jens Barrenscheen, München (DE)

(73) Assignee: Infineon Technologies AG, Munich (DE)

( * ) Notice: Subject to any disclaimer, the term of this patent is extended or adjusted under 35 U.S.C. 154(b) by 336 days.

(21) Appl. No.: 10/308,396

(22) Filed: Dec. 3, 2002

(65) Prior Publication Data

US 2003/0126339 A1 Jul. 3, 2003

(30) Foreign Application Priority Data

Dec. 3, 2001 (EP) ................... 01128727

(51) Int. Cl.
*G06F 13/14* (2006.01)
*G06F 3/00* (2006.01)
*G06F 13/00* (2006.01)
*G06F 13/42* (2006.01)
*G06F 13/24* (2006.01)

(52) U.S. Cl. ............... 710/305; 710/4; 710/100; 710/106; 710/268; 710/260; 711/200; 370/475

(58) Field of Classification Search ............. 711/200; 710/4, 100, 106, 268, 260, 305; 370/475
See application file for complete search history.

(56) References Cited

U.S. PATENT DOCUMENTS

| | | | | |
|---|---|---|---|---|
| 4,204,250 A | * | 5/1980 | Getson et al. ............ | 710/34 |
| 4,878,166 A | * | 10/1989 | Johnson et al. .......... | 710/307 |
| 5,347,559 A | | 9/1994 | Hawkins et al. | |
| 5,530,902 A | * | 6/1996 | McRoberts et al. ...... | 710/28 |
| 5,581,782 A | | 12/1996 | Sarangdhar et al. | |
| 5,713,000 A | | 1/1998 | Larson | |
| 5,802,392 A | * | 9/1998 | Epstein et al. ........... | 710/4 |
| 5,897,666 A | * | 4/1999 | Mallick et al. .......... | 711/217 |
| 5,948,094 A | | 9/1999 | Solomon et al. | |
| 5,978,865 A | * | 11/1999 | Hansen et al. ........... | 710/22 |
| 6,085,259 A | * | 7/2000 | Rode et al. ............... | 710/9 |
| 6,627,477 B1 | * | 9/2003 | Hakey et al. ............. | 438/106 |
| 6,732,249 B1 | * | 5/2004 | Pickreign et al. ........ | 711/202 |
| 6,763,415 B1 | * | 7/2004 | Tischler .................... | 710/240 |
| 6,772,315 B1 | * | 8/2004 | Perego ...................... | 711/207 |

(Continued)

FOREIGN PATENT DOCUMENTS

GB 2 318 487 A 4/1998

(Continued)

OTHER PUBLICATIONS

Luk, Chi-Keung, et al., "Memory Forwarding: Enabling Aggressive Layout Optimizations by Guaranteeing the Safety of Data Relocation," 1999, IEEE Proceedings of the 26th International Symposium on Computer Architecture, p. 88-99.*

(Continued)

*Primary Examiner*—Rehana Perveen
*Assistant Examiner*—Faisal Zaman
(74) *Attorney, Agent, or Firm*—Laurence A. Greenberg; Werner H. Stemer; Ralph E. Locher

(57) ABSTRACT

A data transmission device is used to forward data that have been received from a first device, and are intended for a second device, to the second device. The data transmission device described has a whole series of characteristics that allow the data that are to be transmitted to be transmitted very easily very quickly and which confer additional functions on the data transmission device.

40 Claims, 5 Drawing Sheets

U.S. PATENT DOCUMENTS 6,865,667 B1 * 3/2005 Moyer et al. ................ 712/234
2001/0032286 A1 * 10/2001 Pawlowski .................. 710/260

FOREIGN PATENT DOCUMENTS

WO     WO 01/48621 A1    7/2001

OTHER PUBLICATIONS

Fratto, Mike, "Network Address Translation: Hiding in Plain Sight," Sep. 15, 1998, Network Computing, p. 110.*

\* cited by examiner

DATA TRANSMISSION DEVICE USED TO FORWARD DATA RECEIVED AT A FIRST DEVICE FOR A SECOND DEVICE TO THE SECOND DEVICE

BACKGROUND OF THE INVENTION

Field of the Invention

The present invention relates to a data transmission device used to forward data that have been received from a first device, and are intended for a second device, to the second device.

Such a data transmission device is, by way of example, a serial or parallel interface in a program-controlled unit, such as a microprocessor, microcontroller or signal processor.

Such an interface can output data supplied to it by one of the other components of the program-controlled unit to another module and/or can receive data that are output by another module and are intended for the program-controlled unit, and can prompt forwarding of the data within the program-controlled unit.

The other module can likewise be a program-controlled unit or can be any other module, such as a memory module.

A configuration in which two program-controlled units can interchange data with one another via interfaces is known in the art. Such a configuration contains a first microcontroller and a second microcontroller.

The first microcontroller contains a CPU, peripheral units, a memory and an interface, with the components being connected to one another by an internal bus.

The second microcontroller contains a CPU, peripheral units, a memory and an interface, with the components being connected to one another by an internal bus.

The interface in the first microcontroller and the interface in the second microcontroller are connected to one another by a connection that contains one or more lines.

If the interfaces are parallel interfaces, addresses, data and control signals can be transmitted between the interfaces simultaneously and therefore very quickly. On the other hand, a very large number of pins need to be provided for the interfaces, however, as a result of which the program-controlled units become very large.

If the interfaces are serial interfaces, they require fewer pins. On the other hand, the addresses, data and control signals need to be transmitted serially, however, as a result of which a great deal of time is required for data transmission.

In both cases, i.e. both with serial interfaces and with parallel interfaces, the transmission of data involves severe loading of the CPUs in the program-controlled units. The CPU in the program-controlled unit outputting data needs to access the interface repeatedly in order to supply the interface with the addresses, data and control signals which it needs to output. The CPU in the program-controlled unit receiving data needs to access the interface repeatedly in order to fetch the addresses, data and control signals received from the interface and to forward the data to their destination within the program-controlled unit.

SUMMARY OF THE INVENTION

It is accordingly an object of the invention to provide a data transmission device that overcomes the above-mentioned disadvantages of the prior art devices of this general type, in which it is possible to transmit data that are to be transmitted between various modules quickly with little complexity.

With the foregoing and other objects in view there is provided, in accordance with the invention, a data transmission assembly for forwarding data received from a first device, and intended for a second device, to the second device. The first device is part of a module containing the data transmission assembly. The data transmission assembly contains a data transmission device transmitting to the second device not only the data to be forwarded to the second device but also information about a place to which the data to be forwarded need to be transmitted within the second device. The data transmission device ascertains the information about the place to which the data to be forwarded need to be transmitted within the second device from an address used to address the data transmission device when the data to be forwarded were supplied to the data transmission device.

The data transmission device makes it possible to transmit data that are to be transmitted between a first device and a second device quickly and with little complexity.

In accordance with an added feature of the invention, the information about the place to which the data to be forwarded need to be transmitted within the second device contains a number of an address range and an address offset specifying a particular address within the address range. The number used for the address range is a number associated with the address range covering the address which was used to address the data transmission device when the data to be forwarded were supplied to the data transmission device. The address offset used is a portion of the address that was used to address the data transmission device when the data to be forwarded were supplied to the data transmission device. The portion functioning as the address offset is an address portion specifying a particular address within the address range covering the address used to address the data transmission device when the data to be forwarded were supplied to the data transmission device.

In accordance with an additional feature of the invention, before forwarding the data to the second device, the data transmission device transmits information about the address range to the second device. The information about the address range associated with the number of the address range contains an address from which it is possible to ascertain a position of the address range that is to be allocated.

In accordance with a further feature of the invention, the address is a start address of the address range that is to be allocated.

In accordance with another feature of the invention, the data transmission device transmits information about the address range that is to be allocated to the number of the address range to the second device only if an association needs to be changed. For every number of the address range, the data transmission device transmits information about the address range that is to be allocated to the number of the address range to the second device.

With the foregoing and other objects in view there is provided, in accordance with the invention, a data transmission assembly for forwarding data received from a first device, and intended for a second device, to the second device. The data transmission assembly contains a data transmission device having an address prediction device for predicting an address or a portion of the address to which the data to be forwarded need to be transmitted within the second device. The first device is part of a module containing the data transmission device, and the data transmission device transmits to the second device not only the data to be forwarded to the second device but also information about a place to which the data to be forwarded need to be transmitted within the second device, and if a prediction made by the address prediction device is correct, the data transmission device transmits to the second device no information or less information about the place to which the data to be forwarded need to be transmitted within the second device.

In accordance with an added feature of the invention, the second device is part of a module containing the data transmission device. The data transmission device is sent not only the data to be forwarded but also information about a place to which the data to be forwarded need to be transmitted within the second device, and if the first device sends the data transmission device no information or less information about the place to which the data to be forwarded need to be transmitted within the second device, the data transmission device ascertains the place using a result of a prediction from the address prediction device.

In accordance with an additional feature of the invention, the data transmission device transmits to the second device not only the data to be forwarded to the second device but also information about a place to which the data to be forwarded need to be transmitted within the second device. The data transmission device checks whether it is possible to assume that the second device is able to ascertain the place to which the data to be forwarded need to be transmitted within the second device when the second device is sent no information or less information about the place in question, and, if this is the case, the data transmission device transmitting to the second device no information or less information about the place to which the data to be forwarded need to be transmitted within the second device. The data transmission device contains an address prediction device for predicting an address or a portion of the address to which the data to be forwarded need to be transmitted within the second device.

In accordance with another feature of the invention, the data transmission device produces an interrupt request signal when prompted by the first device or the second device. The data transmission device can be prompted to produce the interrupt request signal by the data supplied to the data transmission device from the first device or the second device. The data transmission device does not forward the data that prompted the data transmission device to produce the interrupt request signal. The data transmission device can be prompted to produce various interrupt request signals prompting execution of different interrupt service routines.

Other features which are considered as characteristic for the invention are set forth in the appended claims.

Although the invention is illustrated and described herein as embodied in a data transmission device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
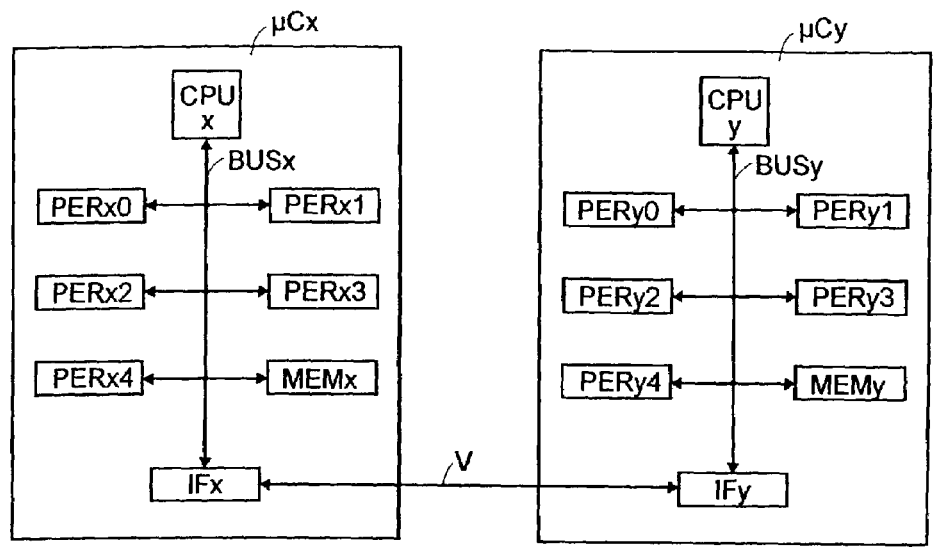
FIG. 1 is a block diagram of a configuration having two modules each having a data transmission device that can be used to transmit data between the modules.

Referring now to the figures of the drawing in detail and first, particularly, to FIG. 1 thereof, there is shown a configuration in which two program-controlled units can interchange data with one another via interfaces provided in them.

The configuration shown in FIG. 1 contains a first microcontroller μCx and a second microcontroller μCy.

The first microcontroller μCx contains a CPU CPUx, peripheral units PERx0 to PERx4, a memory MEMx and an interface IFx, with the components being connected to one another by an internal bus BUSx.

The second microcontroller μCy contains a CPU CPUy, peripheral units PERy0 to PERy4, a memory MEMy and an interface IFy, with the components being connected to one another by an internal bus BUSy.

The interface IFx in the first microcontroller μCx and the interface IFy in the second microcontroller μCy are connected to one another by a connection V that contains one or more lines.

If the interfaces IFx and IFy are parallel interfaces, addresses, data and control signals can be transmitted between the interfaces simultaneously and therefore very quickly. On the other hand, a very large number of pins need to be provided for the interfaces IFx and IFy, however, as a result of which the program-controlled units μCx and μCy become very large.

If the interfaces IFx and IFy are serial interfaces, they require very many fewer pins. On the other hand, the addresses, data and control signals need to be transmitted serially, however, as a result of which a great deal of time is required for data transmission.

In both cases, i.e. both with serial interfaces and with parallel interfaces, the transmission of data involves severe loading of the CPUs in the program-controlled units. The CPU in the program-controlled unit outputting data needs to access the interface repeatedly in order to supply the interface with the addresses, data and control signals which it needs to output. The CPU in the program-controlled unit receiving data needs to access the interface repeatedly in order to fetch the addresses, data and control signals received from said interface and to forward the data to their destination within the program-controlled unit.

Turning now to the invention and an example under consideration, the data transmission device described is an interface in a module which can be used to transmit data to another module and which can be used to receive data output by another module.

The module of which the data transmission device described is part is a microcontroller in the example under consideration. However, the module could also be another program-controlled unit, such as a microprocessor or a signal processor, or any other module, such as a memory chip.

The configuration used to describe the operation of the data transmission device presented here is the configuration which is shown in FIG. 1, i.e. a configuration containing the two microcontrollers, but the interfaces IFx and IFy in these microcontrollers are each formed by a data transmission device described in more detail below.

Before the particulars of the configuration and manner of operation of the interfaces IFx and IFy are described in more detail, the operation of the interfaces IFx and IFy will first be described in a general form.

When one of the components in the microcontroller µCx needs to transmit data to one of the components in the microcontroller µCy, it transmits the data via the internal bus BUSx to the interface IFx, which converts the data received into a particular format and transmits them to the interface IFy via the connection V. The interface IFy receives the data, ascertains their destination within the microcontroller µCy and finally transmits the data to their destination via the bus BUSy.

A similar situation applies when one of the components in the microcontroller µCy needs to transmit data to one of the components in the microcontroller µCx. In this case, the component in question in the microcontroller µCy transmits the data to be transmitted via the internal bus BUSy to the interface IFy, which converts the data received into a particular format and transmits them to the interface IFx via the connection V. The interface IFx receives the data, ascertains their destination within the microcontroller µCx and finally transmits the data to their destination via the bus BUSx.

While the interface IFy is transmitting the data received via the connection V to their destination within the microcontroller µCy via the bus BUSy, it is the bus master on the bus BUSy; while the interface IFx is transmitting the data received via the connection V to their destination within the microcontroller µCx via the bus BUSx, it is the bus master on the bus BUSx.

The fact that the interfaces IFx and IFy can become bus masters on the buses BUSx and BUSy is one of the special features of the interfaces described IFx and IFy. This characteristic allows data to be transmitted from the interface to their destination within the microcontroller that contains the interface by the interface itself, i.e. without the assistance of the CPU. The fact that data transmission requires no CPU results in that the interfaces described can also be used to transmit data to modules that have no CPU.

In addition, the interface under consideration in the present case has a whole series of other special features or characteristics.

In the rest of the explanations, for the sake of simplicity, it is always assumed that data are transmitted from the microcontroller µCx to the microcontroller µCy; the statements made in this regard apply accordingly to the opposite data transmission direction, however. It is also assumed that the CPU CPUx is the component in the microcontroller µCx that needs to transmit data to the microcontroller µCy. The transmission of data to the microcontroller µCy can also be prompted by any other component in the microcontroller µCx, however; for this, the statements below apply accordingly.

One of the aforementioned other characteristics of the interface presented here, to be more precise a special feature of the interface presented here which is referred to below as the second characteristic, is that the component in the microcontroller which wants to transmit data to the other microcontroller—that is to say the CPU CPUx in the microcontroller µCx in the example under consideration—supplies the interface IFx only with the data which are to be transmitted, and particularly not with the address which represents the destination for the data within the microcontroller µCy. The address can be ascertained by the interface IFx itself, specifically from the address which the CPUx uses to address it when transmitting to it the data which are to be forwarded.

The address which the CPU CPUx uses to address the interface IFx when transmitting to it the data which are to be forwarded is referred to below as the address used for interface addressing; the address representing the destination for the data to be forwarded within the microcontroller µCy is referred to below as the data target address.

The addresses that can be used for interface addressing, to be more precise the address range covering the addresses, is divided into a plurality of (4 in the example under consideration) subranges. The subranges are referred to below as pipes. The pipe covering the address used for interface addressing can be used by the interface IFx to ascertain a first portion of the data target address. The data target address portion, referred to below as the base address, represents the m most significant bits of the data target address in the example under consideration. m is a variable in the example under consideration and is stipulated by the CPU CPUx. The respective base address to be used is ascertained using an association that is known to the interface IFx and which provides each pipe with a particular associated base address.

In the example under consideration, which pipe has which associated base address is stipulated by the CPU CPUx and is communicated to the interface IFx by the latter. The association can be altered, preferably even dynamically, i.e. can be altered while the microcontroller µCx is operating. Therefore, the CPU CPUx can allocate a different base address to any pipe at any time.

To avoid misunderstandings, it will be pointed out that the address range associated with a pipe and the base address associated with the pipe in question can be stipulated entirely independently of one another.

The base address to be used can be ascertained by the interface IFx extremely easily. The interface IFx merely needs to ascertain which pipe contains the address used for interface addressing, and then to use the association that is known to it to ascertain the base address associated with this pipe.

The remaining portion of the data target address, which is referred to below as the address offset, to be more precise the portion of the data target address which contains the n less significant bits of the data target address, can be ascertained from the position of the address used for interface addressing within the pipe which covers it. In the example under consideration, n is variable and is stipulated by the CPU CPUx. A simple, but not the only, way of ascertaining the address offset is to ascertain it by subtracting a reference address situated within the pipe in question from the address used for interface addressing. The reference address chosen can be, by way of example, the start address of the pipe that covers the address used for interface addressing.

To obtain the full data target address, it is merely necessary to assemble (line up) the base address and the address offset in the correct order. This provides a very simple way for the interface IFx to ascertain the data target address itself. There is therefore no need for the CPU CPUx to transmit the address to the interface IFx in a separate bus cycle. Therefore, the CPUx is loaded to a lesser degree when transmitting data to the microcontroller µCy than is the case to date.

The data target address ascertained by the interface IFx can be transmitted to the microcontroller µCx by the interface IFx together with the data which are to be forwarded to the microcontroller µCy, with the transmission being able to be effected in any manner, that is to say either serially or in parallel, or as described below.

A third characteristic of the interface presented here is that the interface IFx does not transmit the full data target address to the microcontroller µCy with the data which are to be forwarded to the microcontroller µCy, but rather only a pipe number and the address offset, the pipe number being the number of the pipe which covers the address used for interface addressing.

The microcontroller µCy receiving the address information, to be more precise the interface IFy in the microcontroller, can ascertain the full data target address from the pipe number and the address offset. To do this, the interface IFy merely needs to ascertain which base address is associated with the pipe number, and then to assemble the base address and the address offset to form the address.

Which base address is associated with which pipe number is known to the microcontroller µCy because it has been notified of this by the microcontroller µCx using a base address transmission message, which will be described in more detail later; every time the CPU CPUx performs a configuration or reconfiguration which allocates a new base address to a pipe, the interface IFx automatically sends the aforementioned base address transmission message to the interface IFy, and the interface IFy takes receipt of the base address transmission message as an opportunity to allocate the base address contained in the base address transmission message to the pipe number contained in the base address transmission message, so that the interface IFy can always easily and reliably ascertain which base address it needs to use for data target address generation.

A fourth characteristic of the interface presented here is that the interface IFx can, under certain circumstances, also dispense with transmitting the address offset to the microcontroller µCy.

This is so because both the interface IFx and the interface IFy contain an address prediction unit which respectively attempts to predict the next data target address, or at least the portion thereof which is formed by the address offset, and because, if the address offset is predicted correctly, the interface IFy can use the address offset predicted by the address prediction unit to generate the data target address. The rules used for the address prediction are of no importance. However, what is important is that the predictions in the interfaces IFx and IFy respectively produce the same results.

In the example under consideration, it is assumed that the address prediction units predict "only" the address offset. However, the statements below apply in a corresponding manner to the situation in which the address prediction units predict the complete data target address.

If the interface IFx now establishes that the data target address, to be more precise the address offset which needs to be used to generate it, matches the address offset predicted by the address prediction unit in the interface IFx, the address offset does not need to be transmitted to the interface IFy; it is sufficient if the interface IFy receives a signal indicating that the address prediction unit has predicted the address offset correctly. In this case, the interface IFy can use the address offset predicted by its address prediction unit for the purpose of data target address generation and is not instructed by the interface IFx to transmit the address offset which is to be used.

A fifth characteristic of the interface presented here is that it has an interrupt generation device and that it can be commanded from outside the program-controlled unit containing it, to be more precise by another module or by the interface in the other module, to produce a particular interrupt request. This allows the microcontroller µCx to prompt the interface IFy in the microcontroller µCy to produce an interrupt request signal (to prompt the microcontroller µCy to execute an interrupt service routine). Preferably, the interrupt generation device can output various interrupt request signals, i.e. interrupt request signals which prompt execution of various interrupt service routines, with it being possible for the microcontroller µCx (the interface IFx of the microcontroller) to prescribe which interrupt request signal the interface containing the interrupt generation device—i.e. the interface IFy in the example under consideration—needs to output.

A sixth characteristic of the interface presented here is that the addresses which can be used to address the interface via the internal bus in the module containing it are chosen such that they fully or partially match the addresses which are used to address other components in the program-controlled unit in question via the internal bus. By way of example, it would be conceivable for the addresses that can be used to address the interface IFx via the internal bus BUSx to contain the addresses that can be used to address the memory MEMx via the internal bus BUSx. This makes it possible for data written to the memory MEMx to be automatically written to the memory MEMy too with a certain short time delay, and/or for data that are read from the memory MEMx to be automatically read from the memory MEMy too. The effect that can be achieved by this is that the content of the memory MEMy is a copy of the content of the memory MEMx. This is found to be advantageous when configuring systems with error redundancy and failsafe systems, for example.

A seventh characteristic of the interface presented here is that the interface can access only unprotected components in the microcontroller containing it. In the example under consideration, the components in the microcontroller which need to be protected against access by the interface when required have an associated protection bit or the like whose content governs whether or not the respective component is accessed by the interface. In addition or as an alternative to preventing the component in question from accessing a component protected by a protection bit, provision can be made for the component in question to output an interrupt request signal when it is accessed. The component executing the interrupt service routine, that is to say in the CPU, can then decide how such access is to be handled and/or what further measures need to be taken. The protection bits are set and reset by the CPU in the microcontroller containing the components that are to be protected. This makes it possible to prevent unauthorized access thereto from outside the microcontroller.

The interface presented here has all of the characteristics. However, it ought to be clear and requires no further explanation that the interface described would also be found to be advantageous if it had only some of the characteristics, that is to say only a single one or a particular plurality of the characteristics. The characteristics can be used either individually or else in any combination.

The configuration and manner of operation of the interfaces IFx and IFy will be described in more detail below.

Figure 2:
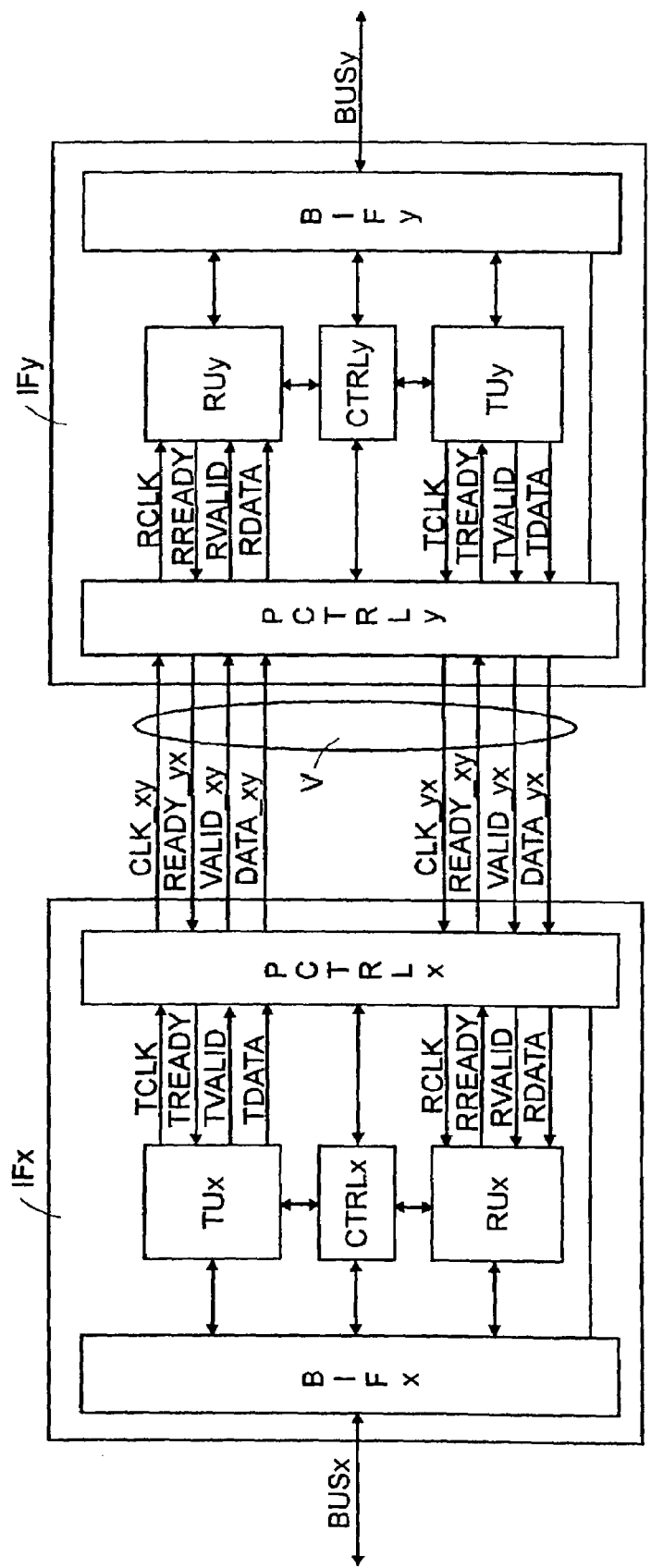
FIG. 2 is a block diagram showing a configuration and connection of the data transmission devices in the configuration shown in FIG. 1.

The interfaces IFx and IFy are of identical construction. The basic configuration of the interfaces IFx and IFy and of the connection V connecting them to one another is shown in FIG. 2.

Accordingly, the interface IFx contains a bus interface BIFx, a transmission unit TUx, a reception unit RUx, a port control device PCTRLx, and a control device CTRLx controlling the components.

The interface IFx is connected by the bus interface BIFx to the internal bus BUSx in the microcontroller μCx and by a port control device PCTRLx to the connection V connecting the interface IFx and the interface IFy to one another.

The interface IFy contains a bus interface BIFy, a transmission unit TUy, a reception unit RUy, a port control device PCTRLy, and a control device CTRLy controlling the components.

The interface IFy is connected by the bus interface BIFy to the internal bus BUSy in the microcontroller μCy and by the port control device PCTRLy to the connection V connecting the interface IFx and the interface IFy to one another.

The transmission unit TUx outputs signals and data TCLK, TVALID and TDATA to the port control device PCTRLx and is supplied with a signal TREADY by the port control device PCTRLx. The reception unit RUx outputs a signal RREADY to the port control device PCTRLx and is supplied with signals and data RCLK, RVALID and RDATA by the port control device PCTRLx.

The transmission unit TUy outputs signals and data TCLK, TVALID and TDATA to the port control device PCTRLy and is supplied with a signal TREADY by the port control device PCTRLy. The reception unit RUy outputs a signal RREADY to the port control device PCTRLy and is supplied with signals and data RCLK, RVALID and RDATA by the port control device PCTRLy.

The connection V connecting the interface IFx and the interface IFy to one another contains a total of 8 lines, with 4 lines being used to connect the transmission unit TUx to the reception unit RUy, and 4 lines being used to connect the transmission unit TUy to the reception unit RUx.

The 4 lines used to connect the transmission unit TUx to the reception unit RUy are denoted in FIG. 2 by the reference symbols CLK_xy, READY_yx, VALID_xy and DATA_xy. The 4 lines used to connect the transmission unit TUy to the reception unit RUx are denoted in FIG. 2 by the reference symbols CLK_yx, READY_xy, VALID_yx and DATA_yx. The last two letters of the line labels, i.e. xy or yx, each indicate the source and the target of the signals and data transmitted via them; xy means that the line in question is used to transmit signals and data from μCx to μCy, and yx means that the line in question is used to transmit signals and data from μCy to μCx.

Among the Lines:

a) the line CLK_xy connects that connection of the transmission unit TUx which outputs the signal TCLK to that connection of the reception unit RUy which receives the signal RCLK;

b) the line READY_yx connects that connection of the reception unit RUy which outputs the signal RREADY to that connection of the reception unit TUx which receives the signal TREADY;

c) the line VALID_xy connects that connection of the transmission unit TUx which outputs the signal TVALID to that connection of the reception unit RUy which receives the signal RVALID;

d) the line DATA_xy connects that connection of the transmission unit TUx which outputs the data TDATA to that connection of the reception unit RUy which receives the data RDATA;

e) the line CLK_yX connects that connection of the transmission unit TUy which outputs the signal TCLK to that connection of the reception unit RUx which receives the signal RCLK;

f) the line READY_xy connects that connection of the reception unit RUx which outputs the signal RREADY to that connection of the reception unit TUy which receives the signal TREADY;

g) the line VALID_yx connects that connection of the transmission unit TUy which outputs the signal TVALID to that connection of the reception unit RUx which receives the signal RVALID; and h) the line DATA_yx connects that connection of the transmission unit TUy which outputs the data TDATA to that connection of the reception unit RUx which receives the data RDATA.

The signals TCLK output by the transmission units TUx and TUy are clock signals for synchronizing the reception units RUy and RUx connected to the respective transmission units. Transmitting these signals also allows data to be transferred between the modules that are clocked internally using clock signals that have various frequencies and/or various phases.

The signals RREADY output by the reception units RUx and RUy are signals that signal that the reception units in question are ready to receive data.

The signals TVALID output by the transmission units TUx and TUy are signals that signal that the transmission unit in question is currently outputting data TDATA to the reception unit receiving the signal TVALID.

In addition, RREADY and TVALID can also be used as handshake signals used to coordinate and monitor transmission of the data TDATA.

The data TDATA output by the transmission units TUx and TUy contain the data that are actually to be output by the respective interfaces IFx and IFy.

Figure 3:
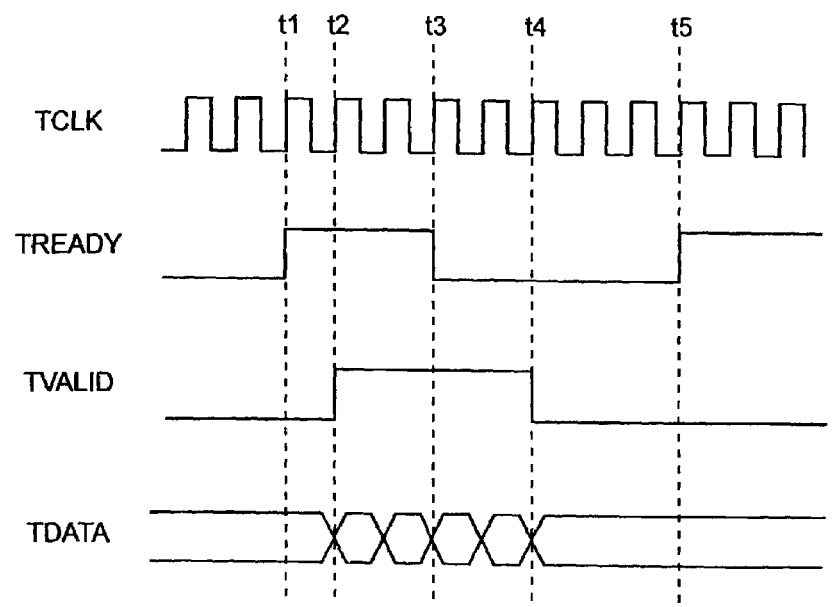
FIG. 3 is a timing diagram showing signals transmitted between the data transmission devices.

FIG. 3 shows the timing of the signals TCLK, TREADY, TVALID and TDATA for the data transmission to proceed correctly.

In the example under consideration, the clock signal TCLK is output all the time, that is to say even when no data are being transmitted. However, provision could also be made for the clock signal TCLK to be output only in particular phases, for example only during the transmission of data and a particular time thereafter.

At the start of the time window shown in FIG. 3, the signals TREADY and TVALID are at the low level and no data TDATA are output.

The signal TREADY which is at the low level signals that the reception unit RU to which data need to be transmitted is not ready to receive data; the signal TVALID which is at the low level signals that currently no data TDATA are being output.

As soon as the reception unit RU is ready to receive data, the signal TREADY changes from the low level to the high level. In the example under consideration, this is the case at a time denoted by t1.

The transmission unit TU recognizes from this that it can now start to output data TDATA, provided that it has data to transmit. In the example under consideration, the transmission unit TU starts to output data TDATA at a time t2 that comes after the time t1; at the same time, the signal TVALID changes from the low level to the high level.

From the level change of TVALID occurring at the time t2, the reception unit RU recognizes that data are now being transmitted to it and reads in the data in time with the clock signal TCLK.

At a time t3 that comes a certain time after the time t2, the signal TREADY changes from the high level to the low level. As a result, the transmission unit TU receives confirmation from the reception unit RU that it is receiving the data transmitted to it.

After the time t3, the transmission unit TU can continue to transmit data TDATA for an arbitrary period. In the example under consideration, the transmission device TU continues to transmit data TDATA up to a time t4 that comes after the time t3. At the end of the transmission of TDATA, i.e. likewise at the time t4, TVALID also changes from the high level to the low level again.

The level change in TVALID signals to the reception device RU that no further data TDATA are being transmitted.

At a time t5 that comes a certain time after the time t4, TREADY changes from the low level to the high level again, which signals that the reception unit is ready to receive data again.

The signal TREADY, to be more precise a deviation in the timing of the signal TREADY from a prescribed timing (for example that shown in FIG. 3), can be used by the reception device RU to signal to the transmission device the occurrence of errors as well.

In the Example Under Consideration, a) if the signal TREADY does not fall to the low level between the times t2 and t4, i.e. during the transmission of data TDATA, that is to say it is still at the high level at the time t4, the data which are output by the transmission unit TU have not been received or have not been accepted by the reception unit RU, and b) if the time between the falling edge of TVALID and the rising edge of TREADY, that is to say the period between t4 and t5, is too long, a parity error has occurred during the data transmission (the reception unit RU reacts to detected parity errors by delayed output of TREADY).

It ought to be clear and requires no more detailed explanation that the timing of the signal TREADY can also signal further or other errors. In this case, the errors can also be signaled by further or other characteristics of the timing of TREADY. Invaluable characteristics of the timing of TREADY can also be, by way of example, that the time between t2 and t3 is longer or shorter than in the undisturbed normal case or that TREADY changes its level at short intervals of time (for example in time with TCLK).

In the example shown in FIG. 2, "only" two modules are connected to one another. Using the interfaces described, it is a very simple matter for more than two modules to be connected to one another as well.

If a plurality of modules need to be connected to one another, to be more precise if, by way of example, the interface needs to be able to transmit data selectively to one of n modules or needs to be able to receive data from one of n modules, it is merely necessary to provide a connection V containing additional lines, and a port control device PCTRL which can set that line of the connection V to which the input and output connections of the transmission unit TU and of the reception unit RU are connected.

Figure 4:
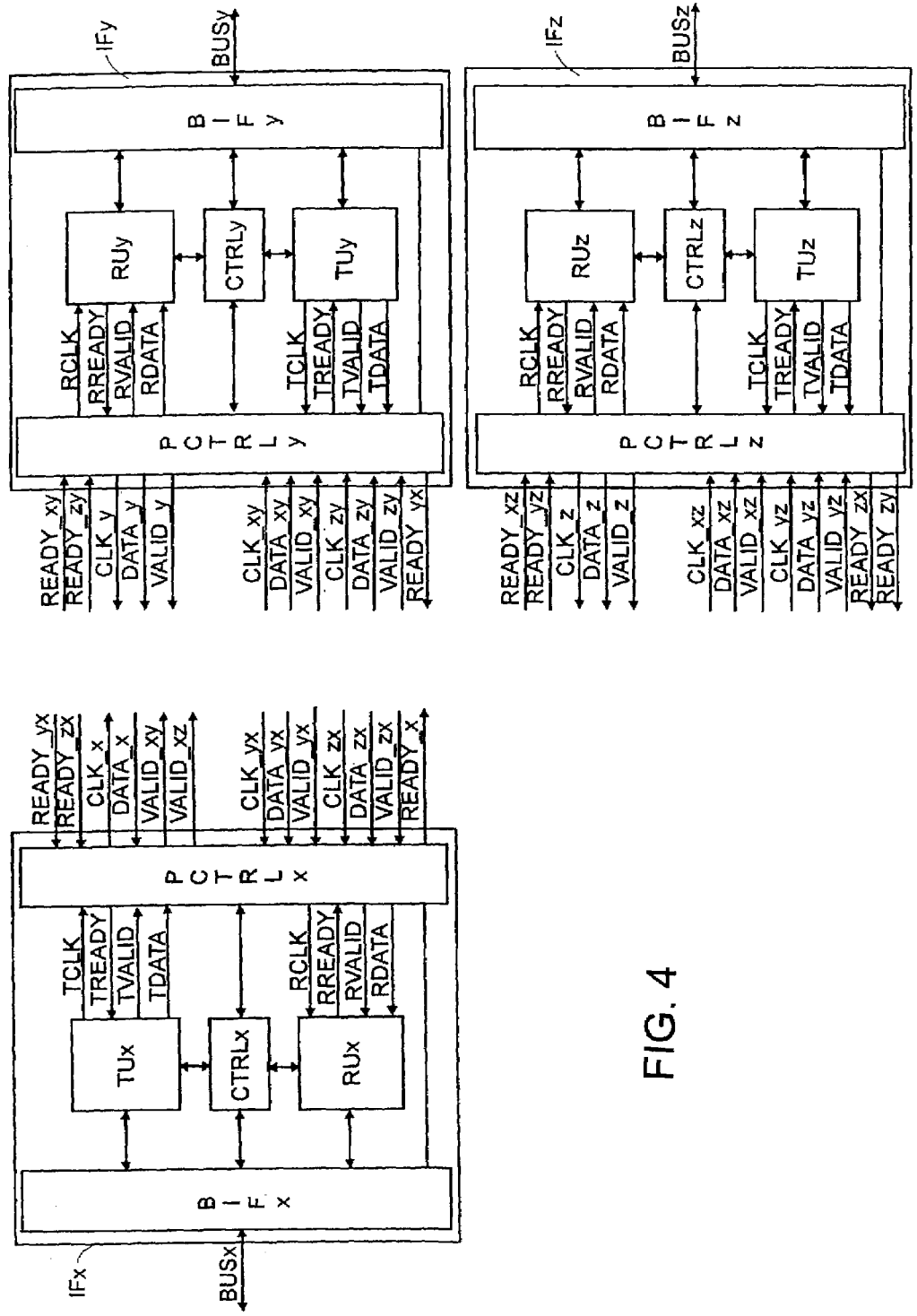
FIG. 4 is a block diagram showing a configuration having three modules each having a data transmission device that can be used to transmit data between the modules.

FIG. 4 shows an example in which three modules, to be more precise three microcontrollers µCx, µCy and µCz, are connected to one another by their interfaces IFx, IFy and IFz.

As can be seen from FIG. 4, particular lines of the connection V are used in duplicate. By way of example, data that need to be transmitted from µCx to µCy are transmitted via the same line (DATA_x) as data that need to be transmitted from µCx to µCz. On the other hand, particular signals need to be transmitted to the various modules via various lines. This is the case with the signal TVALID, for example: TVALID which is to be output from µCx to µCy is transmitted via a different line (VALID_xy) than TVALID which is to be output from µCx to µCz (VALID_xz).

The transmission unit TU and the reception unit RU remain unchanged, however. Therefore, they have as many input and output connections as is the case for the configuration shown in FIG. 2, where only two modules are connected to one another. This is possible because the port control devices have selection devices, such as multiplexers, which can be used to set which line of the connection V is connected to which connection of the transmission unit TU and of the reception unit RU. Actuation of the selection device can preferably be altered dynamically, i.e. during operation of the modules. Therefore, it is possible, by way of example, for the signal TVALID which is output by the transmission unit to be transmitted to µCy via the line VALID_xy in particular phases (when data need to be output to µCy) and to be transmitted to µCz via the line VALID_xz in other phases (when data need to be output to µCz).

In the example under consideration, the aforementioned selection devices are controlled using function registers, to be more precise using data stored in the function registers. The content of the function registers can be altered from outside the interface IF, for example by the CPU or another control device in the module which contains the port control unit PCTRL in question, and/or by data supplied to the interface IF from another module.

Figure 5:
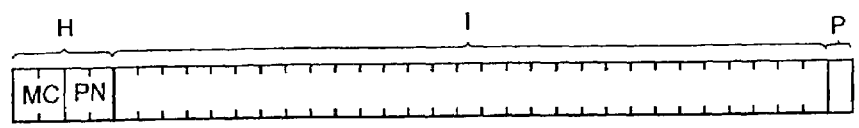
FIG. 5 illustrates a structure of a message that is transmitted between two data transmission devices.

The data TDATA that are output by the interfaces are messages which are transmitted serially bit by bit and whose structure is illustrated in FIG. 5.

In FIG. 5, a message contains a header H containing 4 bits, an information field I containing x bits, and a parity bit P, with the header H for its part containing, in turn, a message code field MC containing 2 bits and a pipe number field PN containing 2 bits.

The message code field MC is used to transmit a message code that indicates what type of message is involved.

In the example under consideration:

a) the message code 00 indicates that the module outputting the message uses the message in question to transmit a base address to the module receiving the message (such a message is referred to below as a base address transmission message);

b) the message code 01 indicates that the module outputting the message uses the message in question to output data to the module receiving the message (such a message is referred to below as a write access message), or that the module outputting the message uses the message in question to request data from the module receiving the message (such a message is referred to below as a read access message);

c) the message code 10 indicates that the module outputting the message uses the message in question to output a command to the module receiving the message (such a message is referred to below as a command message), or that the module outputting the message uses the message in question to respond to a preceding request from the module receiving the message (such a message is referred to below as a response message); and d) the message code 11 indicates that the module outputting the message uses the message in question to output data to the module receiving the message in a particular manner (such a message is referred to below as a special write access message) or that the module outputting the message uses the message in question to request data from the module receiving the message in a particular manner (such a message is referred to below as a special read access message).

The pipe number field PN is used to transmit a value that represents the pipe number already mentioned above. In this case, the pipe number 00 denotes a pipe 0, the pipe number 01 denotes a pipe 1, the pipe number 10 denotes a pipe 2 and the pipe number 1 denotes a pipe 3.

The parity bit P of a message allows the module receiving the message to check whether the message has been transmitted without error. It ought to be clear and requires no more detailed explanation that, instead of the parity bit, another code can also be transmitted which allows identification of transmission errors, for example a checksum or a signature.

The content of the information field I of a message depends on the type of message; the length of the information field I likewise (but not exclusively) depends on this.

Figure 6:
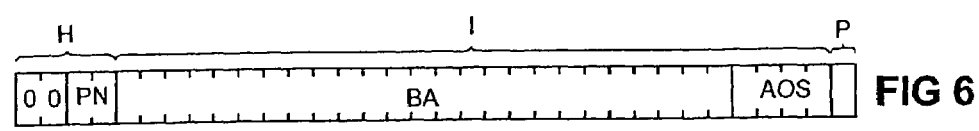
FIG. 6 illustrates a structure of a base address transmission message.

The structure of a base address transmission message is illustrated in FIG. 6.

As can be seen from FIG. 6, the information field I of such a message contains a base address field BA and an address offset variable field AOS. In the example under consideration, the base address field BA contains 28 bits and the address offset variable field AOS contains 4 bits; the fields can also be of any other sizes, however.

The base address field BA contains the base address already mentioned above. The base address allocates the interface receiving the message in question to the pipe indicated in the pipe number field.

The address offset variable field AOS contains information about the length (the number of bits) of an address offset field of messages which also transmit the address offset.

A base address transmission message is transmitted whenever, and specifically also only, when the interface outputting the message assigns a new base address to one of the available pipes or when the length (the number of bits) of the address offset is changed.

Figure 7:
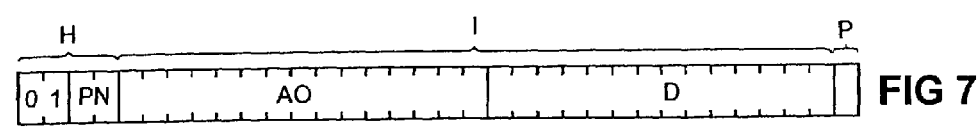
FIG. 7 illustrates a structure of a write access message.

The structure of a write access message is illustrated in FIG. 7. As can be seen from FIG. 7, the information field I of such a message contains an address offset field AO and a data field D.

The message contains no information about the length of the address offset field AO and/or the length of the data field D.

The length, i.e. the number of bits, of the address offset field AO is known to the interface receiving the message; it is the value contained in the address offset variable field AOS of the base address transmission message. The rest of the bits in the information field I belong to the data field D. In the example under consideration, the data field D contains 8, 16 or 32 bits.

When an interface receives a write access message, it writes the data contained in the data field D of the write access message to their destination within the microcontroller containing the interface. Before the interface does this, it first ascertains the destination, i.e. the data target address, to which the data need to be forwarded. The data target address is made up of the base address, which is associated with the pipe specified in the write access message pipe number field PN, and the address offset contained in the write access message address offset field AO. The base address contains the more significant bits of the data target address, and the address offset contains the less significant bits of the data target address. When assembled, the base address and the address offset produce the required data target address. The address offset to be used is known to the interface receiving the write access message from the write access message address offset field; the base address has been transmitted to the interface using the base address transmission message and is therefore likewise known to the interface. The interface merely needs to line up the addresses known to it in the correct order in order to obtain the necessary data target address. When the interface has ascertained the data target address, it requests allocation of the internal bus. When the bus has been allocated to the interface, i.e. when the interface is the bus master, it transmits the data contained in the write access message data field D to the data target address.

Figure 8:
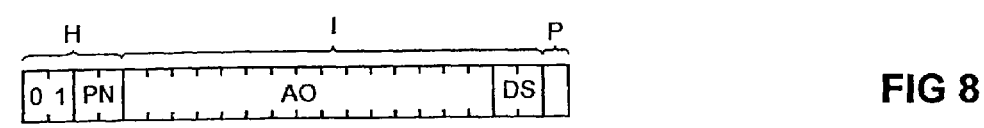
FIG. 8 illustrates a structure of a read access message.

The structure of a read access message is illustrated in FIG. 8.

As can be seen from FIG. 8, the information field I of such a message contains an address offset field AO and a data volume field DS.

The message contains no information about the length of the address offset field AO and/or the length of the data volume field DS. The length, i.e. the number of bits, of the address offset field AO is known to the interface receiving the message, however; it is the value contained in the address offset variable field AOS of the base address transmission message. The rest of the bits in the information field I belong to the data volume field DS. In the example under consideration, the data volume field DS contains 2 bits, but could also be larger or smaller.

When an interface receives a read access message, it procures the data requested by the read access message from a data source provided within the microcontroller containing the interface and forwards them in a response message to the module outputting the read access message. Before the interface obtains the requested data, it first ascertains the data source, i.e. the data source address, from which the data need to be fetched. The data source address is made up of the base address, which is associated with the pipe specified in the read access message pipe number field PN, and the address offset contained in the read access message address offset field AO. The base address contains the more significant bits of the data source address, and the address offset contains the less significant bits of the data source address. When assembled, the base address and the address offset produce the required data source address. The address offset to be used is known to the interface receiving the read access message from the address offset field of the read access message; the base address has been transmitted to the interface using the base address transmission message and is therefore likewise known to the interface. The interface merely needs to line up the addresses known to it in the correct order in order to obtain the necessary data source address. When the interface has ascertained the data source address, it requests allocation of the internal bus. When the bus has been allocated to the interface, i.e. when the interface is the bus master, it fetches the data requested by the read access message from the data source address. The data volume to be fetched or forwarded is specified by the data volume field DS. The content of the data volume field DS indicates whether the read access message is requesting 1 byte, 2 bytes or 4 bytes. The data requested by the data source are then forwarded to the module outputting the read access message using a response message.

A write access message and a read access message are characterized by the same message code, namely the message code 01, which results in that they cannot be distinguished from one another using the message code. However, they can be distinguished using the different lengths of the information fields I. This is so because, while the information field I of a write access message contains the address offset plus 8, 16 or 32 bits alternatively, the information field I of a read access message contains only the address offset plus 2 bits.

Figure 9:
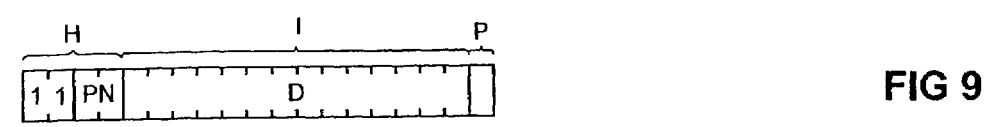
FIG. 9 illustrates a structure of a special write access message.

The structure of a special write access message is illustrated in FIG. 9.

As can be seen from FIG. 9, the information field I of such a message contains only a data field D and, in contrast to the normal write access message, contains no address offset field AO, in particular.

In the example under consideration, the data field D contains 8, 16 or 32 bits, like the data field D in a normal write access message.

Normally, when write access to a module is to be effected, a normal write access message is sent. In particular cases, however, it is possible to use a special write access message that contains no address offset. In the example under consideration, it is possible to use special write access message under particular circumstances because the interfaces communicating with one another each contain an address prediction device, with the address prediction devices provided in the various interfaces operating in exactly the same manner, to be more precise always making identical predictions. If an interface wishing to transmit data to another module now establishes that the data target address within the other module is the data target address predicted by the address prediction device, or that the address offset which needs to be used to form the data target address is the address offset predicted by the address prediction device, then it is possible to dispense with transmitting the address offset to the other module, because the address prediction device in the other module has, of course, likewise correctly predicted the data target address to be used or the address offset to be used, and therefore the data target address predicted by the address prediction device or the address offset predicted by the address prediction device can be used.

Apart from this, an interface receiving a special write access message reacts like an interface receiving a normal write access message. That is to say it requests allocation of the internal bus and transfers the data contained in the special write access message data field D to the data target address ascertained as described.

Figure 10:
FIG. 10 illustrates a structure of a special read access message.

The structure of a special read access message is illustrated in FIG. 10.

As can be seen from FIG. 10, the information field I of such a message contains only a data volume field DS and, in contrast to the normal read access message, contains no address offset field AO, in particular.

In the example under consideration, the data volume field DS contains 2 bits, like the data volume field DS in a normal write access message.

Normally, when a read access to a module is to be effected, a normal read access message is sent. In particular cases, however, it is possible to use a special read access message that contains no address offset. In the example under consideration, it is possible to use special read access messages under particular circumstances because the interfaces communicating with one another each contain an address prediction device, with the address prediction devices provided in the various interfaces operating in exactly the same manner, to be more precise always making identical predictions. If an interface requesting data from another module now establishes that the data source address within the other module is the address predicted by the address prediction device, or that the address offset which needs to be used to form the data source address is the address offset predicted by the address prediction device, it is possible to dispense with transmitting the address offset to the other module, because the address prediction device in the other module has, of course, likewise correctly predicted the data source address to be used or the address offset to be used, and therefore the data source address predicted by the address prediction device or the address offset predicted by the address prediction device can be used.

Apart from this, an interface receiving a special read access message reacts like an interface receiving a normal read access message. That is to say it requests allocation of the internal bus, procures the data requested by the special read access message from the data source address ascertained as described, and transmits them in a response message to the module outputting the special read access message.

A special write access message and a special read access message are characterized by the same message code, namely the message code 11, which results in that they cannot be distinguished from one another using the message code. However, they can be distinguished using the different lengths of the information fields I. This is so because, while the information field of a special write access message contains 8, 16 or 32 bits alternatively, the information field of a special read access message contains only 2 bits.

Figure 11:
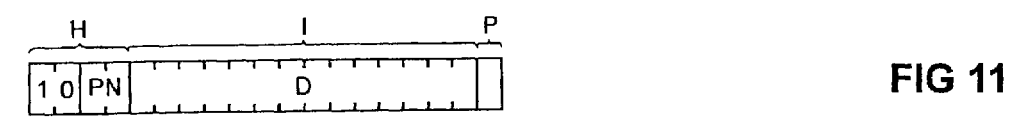
FIG. 11 illustrates a structure of a response message.

The structure of a response message is illustrated in FIG. 11.

As can be seen from FIG. 11, the information field I of such a message contains only a data field D.

The data field D contains 8, 16 or 32 bits, like the data field D of a write access message or of a special write access message.

A response message is output when a read access message or a special read access message has been supplied in advance to the module outputting the response message. The response message is the reaction to the read access message or to the special read access message. To be more precise, a response message outputs the data requested by the read access message or by the special read access message.

When an interface receives a response message, it transfers the data contained in the response message data field D to the microcontroller component that prompted the request for the data in question using a read access message or a special read access message. The response message does not need to contain any information about the data target address, because the module receiving the response message has requested the data contained in the response message itself, of course, and therefore knows the purpose for which it requires the data in question.

Figure 12:
FIG. 12 illustrates a structure of a command message.

The structure of a command message is illustrated in FIG. 12.

As can be seen from FIG. 12, the information field I of such a message contains only a command field C.

In the example under consideration, the command field C contains 4 bits, but could in principle also contains more or fewer bits.

When an interface receives a command message, it executes a command specified by the command field C and by the pipe number field PN, or makes provision for this command to be executed.

In the example under consideration, the commands whose execution can be prompted by a command message can be divided into three groups.

The first group of commands contains commands that configure the interface receiving the command message.

The second group of commands contains commands that prompt the interface receiving the command message to produce a particular interrupt request signal.

The third group of commands contains commands whose meaning is stipulated by the program that is executed by the module receiving the command message, to be more precise by the CPU in the module.

It ought to be clear and requires no more detailed explanation that the commands contained in the command messages can, in principle, be any commands, and that the commands contained in the command messages can, in principle, be executed by any components in the module receiving the command message.

A response message and a command message are characterized by the same message code, namely the message code 10, and therefore they cannot be distinguished from one another using the message code. However, they can be distinguished using the different lengths of the information fields I. This is so because, while the information field of a response message contains 8, 16 or 32 bits alternatively, the information field of a command message contains only 4 bits.

The data transmission device described, to be more precise two of the data transmission devices described, can also be used to transmit data between two devices within a single module.

Figure 13:
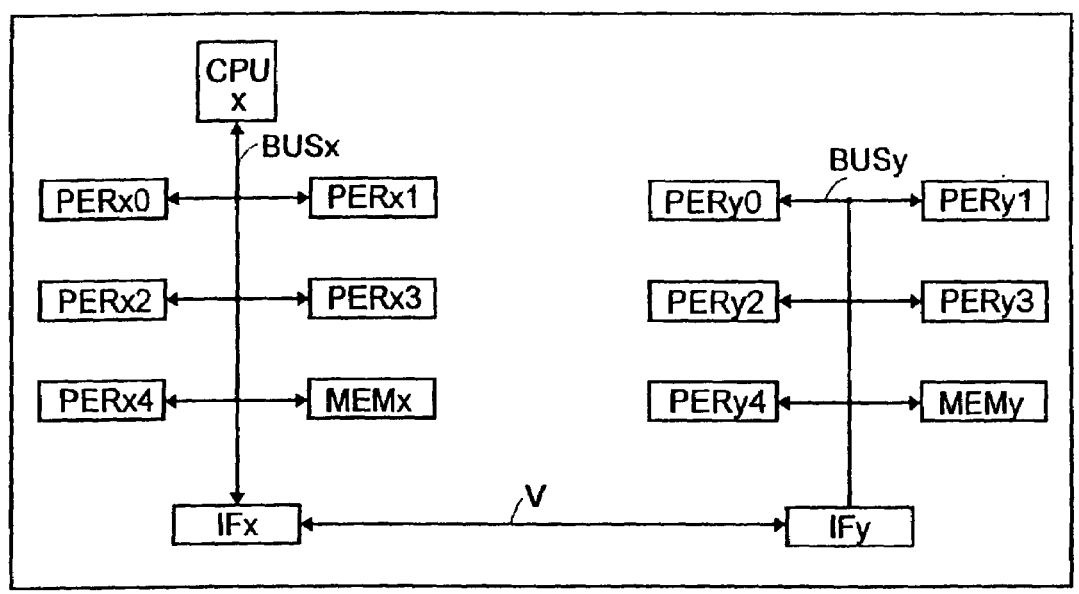
FIG. 13 is a block diagram of a configuration of a module that contains two of the data transmission devices described in order to transmit data which are to be transferred within the module in question.

One possible configuration of a module containing two of the data transmission devices described for the purpose of transferring data that need to be transferred within the module in question is shown in FIG. 13.

The module shown in FIG. 13 is a microcontroller which contains the CPU CPUx, the peripheral units PERx0 to PERy4, the memories MEMx and MEMy, the data transmission devices IFx and IFy, the buses BUSx and BUSy, and the connection V, where a) the bus BUSx connects the CPU CPUx, the peripheral units PERx0 to PERx4, the memory MEMx and the data transmission device IFx to one another;

b) the bus BUSy connects the CPU CPUy, the peripheral units PERy0 to PERy4, the memory MEMy and the data transmission device IFy to one another; and c) the connection V connects the data transmission device IFx and the data transmission device IFy to one another.

The components of the microcontroller correspond to the components denoted by the relevant reference symbols in the configuration shown in FIG. 1. In particular, the configuration and manner of operation of the data transmission devices IFx and IFy in the configuration shown in FIG. 13 correspond exactly to the configuration and manner of operation of the data transmission devices IFx and IFy in the configuration shown in FIG. 1. The only difference is that the components in question are provided in the same module.

It is the responsibility of the data transmission devices IFx and IFy to transmit data between one of the devices connected to the bus BUSx and one of the devices connected to the bus BUSy.

When one of the devices connected to the bus BUSx wishes to transmit data to one of the devices connected to the bus BUSy, the data are transferred via the bus BUSx to the data transmission device IFx, from there via the connection V to the data transmission device IFy, and from there via the bus BUSy to the device connected to the bus BUSy; when one of the devices connected to the bus BUSy wishes to transmit data to one of the devices connected to the bus BUSx, the data are transferred via the bus BUSy to the data transmission device IFy, from there via the connection V to the data transmission device IFx, and from there via the bus BUSx to the device connected to the bus BUSx.

This occurs in exactly the same manner as when data are transmitted between the microcontroller μCx and the microcontroller μCy in the arrangement shown in FIG. 1. It is also possible for data that are transmitted between two devices connected to the same bus to be automatically transferred to one of the devices connected to the other bus as well.

Another possibility is for more than two buses to be connected to one another by the data transmission devices described. The configuration of such a configuration is similar to the design of the configuration shown in FIG. 3.

For the sake of completeness, it will be noted that the module containing the plurality of data transmission devices does not have to be a microcontroller, but can also be any other module in which data need to be transmitted between two or more internal buses.

The data transmission devices IFx and IFy together form a bus bridge but can be produced with much less complexity than conventional bus bridges. In particular, there is no longer any need to link the buses which need to be connected to one another by the bus bridge; the buses can be as far apart from one another as desired and can be connected to one another by the data transmission devices IFx and IFy and the connection V connecting these to one another, which has very little associated complexity on account of the small number of lines which the connection V contains. When using conventional bus bridges, the buses BUSx and BUSy, which can each contain over 100 lines, would need to be linked, which can obviously entail immense complexity and is also problematical on account of the resultant extension of BUSx and/or BUSy; longer buses require more powerful bus drivers and result in the maximum data transmission rate being reduced on account of the relatively long propagation times for the data or signals transmitted via them.

Against all of this background, the data transmission device described is superior to conventional data transmission devices in many respects. It allows, inter alia, data that are to be transmitted, to be transmitted easily and quickly, and also has functions that are not available in conventional data transmission devices. In particular, it is possible to transfer not only data but also bus access operations: access to one particular device can automatically bring about corresponding access to a device which is connected to another bus or is provided in another module.

I claim:

1. A data transmission assembly for forwarding data received from a first device, and intended for a second device, to the second device, the first device and the second device being part of a module containing the data transmission assembly, the data transmission assembly comprising:

a data transmission device connected to a first internal bus of the module;

a further data transmission device connected to a second internal bus of the module;

the data to be transmitted from the first device to the second device being transmitted via the first internal bus to said data transmission device, and from said data transmission device to said further data transmission device via a connection connecting said data transmission device and said further data transmission device to one another, and from said further data transmission device via the second internal bus to the second device;

said data transmission device transmitting to the second device not only the data to be forwarded to the second device but also information about a place to which the data to be forwarded need to be transmitted within the second device, said data transmission device ascertaining the information about the place to which the data to be forwarded need to be transmitted within the second device from an address used to address said data transmission device when the data to be forwarded was supplied to said data transmission device; and said further data transmission device being able to become a bus master on said second internal bus, said further data transmission device forwarding the data to be forwarded via said second internal bus to the second device at its own behest.

2. The data transmission assembly according to claim 1, wherein the information about the place to which the data to be forwarded need to be transmitted within the second device contains a number of an address range and an address offset specifying a particular address within the address range.

3. The data transmission assembly according to claim 2, wherein the number used for the address range is a number associated with the address range covering the address which was used to address said data transmission device when the data to be forwarded was supplied to said data transmission device.

4. The data transmission assembly according to claim 2, wherein the address offset used is a portion of the address which was used to address said data transmission device when the data to be forwarded was supplied to said data transmission device.

5. The data transmission assembly according to claim 4, wherein the portion functioning as the address offset is an address portion specifying a particular address within the address range covering the address used to address said data transmission device when the data to be forwarded was supplied to said data transmission device.

6. The data transmission assembly of claim 1, wherein said data transmission device includes an address prediction device for predicting an address or a portion of the address to which the data to be forwarded need to be transmitted within the second device.

7. The data transmission assembly according to claim 6, wherein if a prediction made by said address prediction device is correct, said data transmission device transmits to the second device no information or less information about the place to which the data to be forwarded need to be transmitted within the second device.

8. The data transmission assembly according to claim 6, wherein the second device is part of a module containing said data transmission device, said data transmission device is sent not only the data to be forwarded but also information about a place to which the data to be forwarded need to be transmitted within the second device, and if the first device sends said data transmission device no information or less information about the place to which the data to be forwarded need to be transmitted within the second device, said data transmission device ascertains the place using a result of a prediction from said address prediction device.

9. The data transmission assembly of claim 1, wherein said data transmission device checks whether it is possible to assume that the second device is able to ascertain the place to which the data to be forwarded need to be transmitted within the second device when the second device is sent no information or less information about the place in question, and, if this is the case, said data transmission device transmits to the second device no information or less information about the place to which the data to be forwarded need to be transmitted within the second device.

10. The data transmission assembly according to claim 9, wherein said data transmission device contains an address prediction device for predicting an address or a portion of the address to which the data to be forwarded need to be transmitted within the second device.

11. The data transmission assembly according to claim 10, wherein at least the first device is part of a module containing said data transmission device, and, if a prediction made by said address prediction device is correct, said data transmission device transmits to the second device no information or less information about the place to which the data to be forwarded need to be transmitted within the second device.

12. The data transmission assembly according to claim 10, wherein the second device is part of a module containing said data transmission device, and, if the first device sends said data transmission device no information or less information about the place to which the data to be forwarded need to be transmitted within the second device, said data transmission device ascertaining the place using a result of a prediction from said address prediction device.

13. The data transmission assembly of claim 1, wherein, if the first device sends said data transmission device no information or less information about the place to which the data to be forwarded need to be transmitted within the second device, said data transmission device ascertains the place using the information which is available in said data transmission device.

14. The data transmission assembly according to claim 13, wherein said data transmission device contains an address prediction device for predicting an address or a portion of the address to which the data to be forwarded need to be transmitted within the second device.

15. The data transmission assembly according to claim 14, wherein at least the first device is part of a module containing said data transmission device, and, if a prediction made by said address prediction device is correct, said data transmission device transmit; to the second device no information or less information about the place to which the data to be forwarded need to be transmitted within the second device.

16. The data transmission assembly according to claim 14, wherein the second device is part of a module containing said data transmission device, and, if the first device sends said data transmission device no information or less information about the place to which the data to be forwarded need to be transmitted within the second device, said data transmission device ascertains the place using a result of a prediction from said address prediction device.

17. The data transmission assembly of claim 1, wherein said data transmission device produces an interrupt request signal when prompted by one of the first device and the second device.

18. The data transmission assembly according to claim 17, wherein said data transmission device can be prompted to produce the interrupt request signal by the data supplied to said data transmission device from one of the first device and the second device.

19. The data transmission assembly according to claim 18, wherein said data transmission device does not forward the data which prompted said data transmission device to produce the interrupt request signal.

20. The data transmission assembly according to claim 17, wherein said data transmission device can be prompted to produce various interrupt request signals prompting execution of different interrupt service routines.

21. A data transmission assembly for forwarding data received from a first device, and intended for a second device, to the second device, the first device being part of a module containing the data transmission assembly, the data transmission assembly comprising:
a data transmission device transmitting to the second device not only the data to be forwarded to the second device but also information about a place to which the data to be forwarded need to be transmitted within the second device, the information about the place to which the data to be forwarded need to be transmitted within the second device containing a number of an address range and an address offset specifying a particular address within the address range.

22. The data transmission assembly according to claim 21, wherein before forwarding the data to the second device, said data transmission device transmits information about the address range to the second device.

23. The data transmission assembly according to claim 22, wherein the information about the address range associated with the number of the address range contains an address from which it is possible to ascertain a position of the address range which is to be allocated.

24. The data transmission assembly according to claim 23, wherein the address is a start address of the address range which is to be allocated.

25. The data transmission assembly according to claim 22, wherein said data transmission device transmits information about the address range which is to be allocated to the number of the address range to the second device only if an association needs to be changed.

26. The data transmission assembly according to claim 22, wherein for every number of the address range, said data transmission device transmits information about the address range that is to be allocated to the number of the address range to the second device.

27. The data transmission assembly of claim 21, wherein the second device is part of a module containing said data transmission assembly, said data transmission device is able to become a bus master on a bus connecting said data transmission device and the second device to one another, and said data transmission device forwards the data to be forwarded via said bus to the second device at its own behest.

28. The data transmission assembly according to claim 27, wherein the first device forms part of a further module.

29. The data transmission assembly according to claim 27, wherein said data transmission device is an interface for the module containing said data transmission device, and said interface is used by the module to transmit the data to another module, said interface can be used by the another module to transmit further data to the module containing said data transmission device.

30. The data transmission assembly according to claim 28, wherein the module containing said data transmission device is a program-controlled unit.

31. The data transmission assembly according to claim 28, wherein the further module is a program-controlled unit.

32. The data transmission assembly according to claim 28, wherein said data transmission device is one of two data transmission devices, and the module and the further module each contains one of said data transmission devices, the data to be transmitted from the first device to the second device are transmitted using said data transmission device in the further module containing the first device and using said data transmission device in the module.

33. The data transmission assembly according to claim 32, wherein said data transmission device in the module and said data transmission device in the further module are identical in at least one of operation and design.

34. The data transmission assembly according to claim 32, wherein said data transmission device in the module and said data transmission device in the further module are identical modules.

35. The data transmission assembly according to claim 27, wherein said data transmission device, the first device and the second device are all part of the module.

36. The data transmission assembly according to claim 35, further comprising a further data transmission device forming part of the module, said data transmission device is connected to a first internal bus of the module, and said further data transmission device is connected to a second internal bus of the module, and the data to be transmitted from the first device to the second device are transmitted via the first internal bus to said data transmission device, and from said data transmission device to said further data transmission device via a connection connecting said data transmission device and said further data transmission device to one another, and from said further data transmission device via the second internal bus to the second device.

37. The data transmission assembly according to claim 35, further comprising a further data transmission device disposed on the module, said data transmission device is connected to a first internal bus of the module, and said further data transmission device is connected to a second internal bus of the module, and the data to be transmitted from the second device to the first device are transmitted via the second internal bus to said further data transmission device, from there to said data transmission device via a connection connecting said further data transmission device and said data transmission device to one another, and from said data transmission device via the first internal bus to the first device.

38. The data transmission assembly according to claim 36, wherein said data transmission device and said further data transmission device are data transmission devices of at least one of identical design and operation.

39. The data transmission assembly according to claim 37, wherein said data transmission device and said further data transmission device are data transmission devices of at least one of identical design and operation.

40. The data transmission assembly according to claim 35, wherein the module is a program-controlled unit.

* * * * *

UNITED STATES PATENT AND TRADEMARK OFFICE
CERTIFICATE OF CORRECTION

| | | |
|---|---|---|
| PATENT NO. | : 7,133,953 B2 | Page 1 of 1 |
| APPLICATION NO. | : 10/308396 | |
| DATED | : November 7, 2006 | |
| INVENTOR(S) | : Jens Barrenscheen | |

It is certified that error appears in the above-identified patent and that said Letters Patent is hereby corrected as shown below:

Column 20,
Lines 1, "transmit;" should read -- transmits --

Signed and Sealed this

Twenty-seventh Day of February, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,133,953 B2 | Page 1 of 1 |
| APPLICATION NO. | : 10/308396 | |
| DATED | : November 7, 2006 | |
| INVENTOR(S) | : Jens Barrenscheen | |

It is certified that error appears in the above-identified patent and that said Letters Patent is hereby corrected as shown below:

<u>Column 20,</u>
Line 51, "transmit;" should read -- transmits --

This certificate supersedes Certificate of Correction issued February 27, 2007.

Signed and Sealed this

Fifth Day of June, 2007

JON W. DUDAS
*Director of the United States Patent and Trademark Office*